United States Patent Office 3,022,282
Patented Feb. 20, 1962

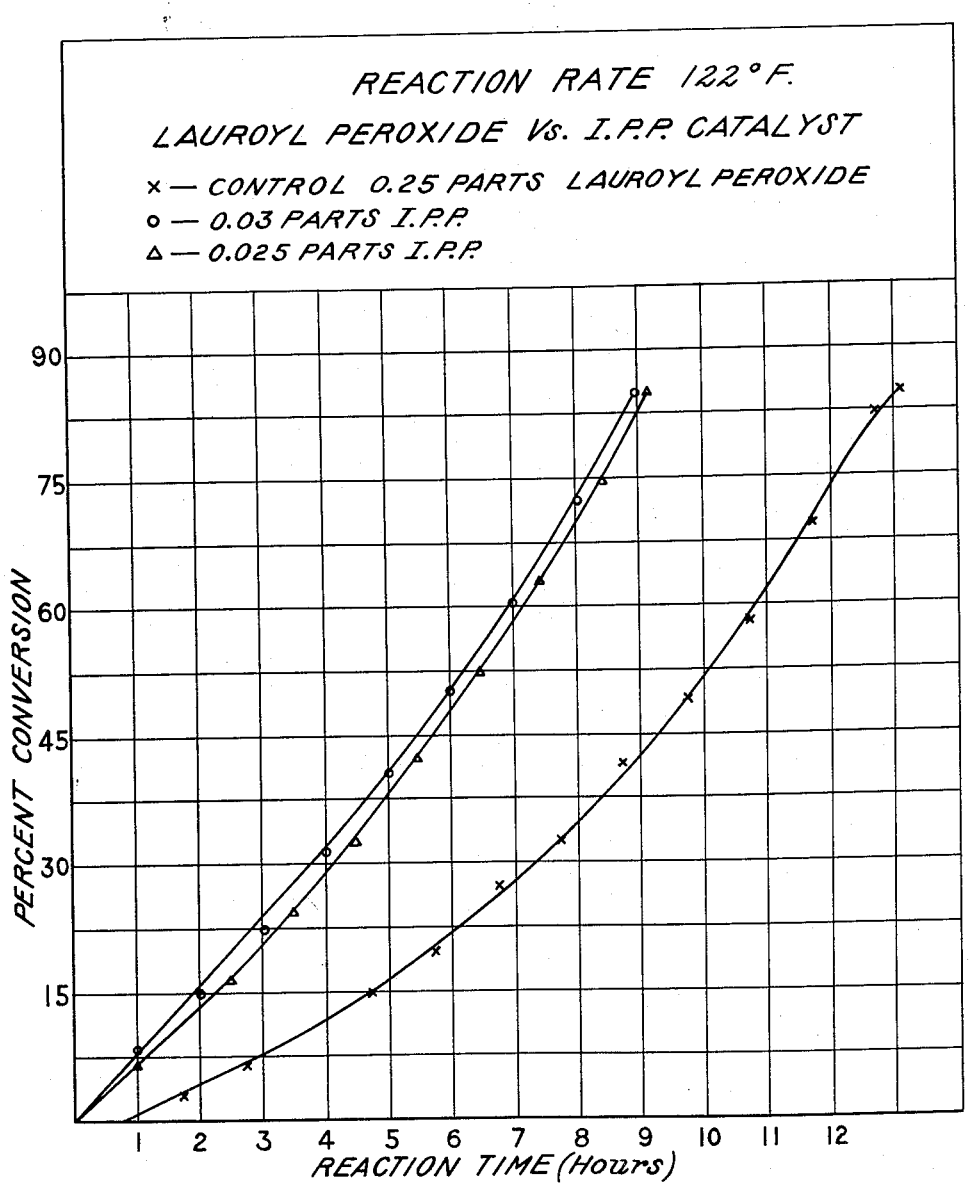

3,022,282
POLYMERIZATION CATALYST FOR
VINYL CHLORIDE
Leonard F. Marous, Painesville, Ohio, and Charles D. McCleary, Naugatuck, Conn., assignors to United States Rubber Company, New York, N.Y., a corporation of New Jersey
Filed Aug. 25, 1959, Ser. No. 835,898
4 Claims. (Cl. 260—92.8)

This invention relates to an improved suspension polymerization process for preparing granular vinyl chloride polymerization products by employing dialkyl peroxy dicarbonate as catalyst, and to the novel products made thereby.

Suspension or bead polymerization is well known in polymer chemistry. In the suspension process, the monomer which contains a suitable catalyst dissolved therein is added to an aqueous medium. The monomer is suspended in said medium in the form of globules which are prevented from recombining by vigorous agitation and the presence of a colloidal suspension stabilizer. The polymerization products formed by this technique are granular in form. This and other polymerization methods, such as emulsion, solvent, and bulk, all of which are initiated by catalytic action, are described by Wakeman in his volume "The Chemistry of Commercial Plastics," published 1947 by Reinhold Publishing Corp., at pages 309–310.

Many oxygen and peroxide compounds, both inorganic and organic, are either known to the art or have been proposed as catalysts for use in one of the aforementioned polymerization methods. Of these, the dialkyl peroxy dicarbonates, which can be prepared according to the methods of Strain et al. [J. Am. Chem. Soc., 72, 1254 (1950)], are especially useful for certain vinyl-type compounds when employed with the mass polymerization technique described in U.S. Patent 2,464,062, issued March 8, 1949. However, as noted in Example X of said patent only a small quantity of polyvinyl chloride can be obtained by this direct method, i.e., refluxing the monomer with a substantial amount of diisopropyl peroxy dicarbonate at the boiling point of the monomer (−13° C.) for a period of five hours. Better yields of polyvinyl chloride cannot be obtained by conducting the mass process under increased temperature and pressure because polymerization of vinyl chloride by means of diisopropyl peroxy dicarbonate occurs explosively at 25° C.

Therefore, it is an object of the present invention to provide an improved suspension process whereby vinyl chloride monomer can be substantially completely polymerized in granular form under moderate temperatures and pressures in the presence of dialkyl peroxy dicarbonate catalysts. Another object is to provide a safe and commercial suspension polymerization process with as high a space-time yield as possible.

We have made the unexpected discovery that it is possible to accomplish the foregoing objects by utilizing very small quantities of dialkyl peroxy dicarbonate, i.e., from 0.005 to 0.100 part thereof per 100 parts by weight of vinyl chloride as the catalyst for the suspension polymerization of vinyl chloride. It was most surprising and advantageous to discover that such small amounts of the dicarbonate would function effectively to catalyze the suspension polymerization. Not only does the process of our invention give rise to a very high productivity but the resulting product generally has properties which make it potentially suitable for electrical applications and for use in contact with foods because of extremely low amount of catalyst and resulting residue.

Briefly stated, the process of the present invention includes the steps of (1) agitating a suspension of 100 parts by weight of liquid vinyl chloride monomer in from 100 to 400 parts of an aqueous medium containing a colloidal suspension stabilizer, (2) introducing from 0.005 to 0.100 part of dialkyl peroxy dicarbonate as catalyst, and (3) heating the suspension to a temperature of from 100° F. to 160° F. until the vinyl chloride monomer is substantially completely polymerized. The charging order of catalyst and vinyl chloride monomer do not necessarily have to be made in this order. However, for purposes of safety this order is preferred so as to avoid high concentrations of dialkyl peroxy dicarbonate. If the catalyst is charged first and the subsequent monomer charge is interrupted for any reason, it would be possible to have concentrations of catalyst in monomer many times stronger than could be controlled with sufficient margin of safety.

The reaction is carried out in a closed reaction vessel or polymerizer under autogenous pressure. The vessel is equipped with an agitator, baffles, and temperature controls. Ordinarily, a jacketed vessel is used so as to better control the temperature, the temperature being critical. The reaction vessel must have enough cooling surface area to effectively remove the heat of polymerization and thereby enable an operator to keep the temperature and, consequently, the pressure under strict control. Agitation of the mixture can be accomplished by various means and may vary considerably. It should be sufficiently vigorous to disperse the liquid vinyl chloride monomer in the form of small globules distributed throughout the aqueous medium.

It has been found that the advantages of the present invention are best obtained by the use of commercially available diisopropyl peroxy dicarbonate as catalyst. This catalyst is supplied in the frozen state as a crystalline solid having a melting point of from 46° F. to 50° F. The pure catalytic material decomposes rapidly at room temperature. Diisopropyl peroxy dicarbonate is easily stabilized against decomposition at room temperature with solvents such as xylene and toluene. The diisopropyl peroxy dicarbonate catalyst may be used in its pure form. However, to avoid premature decomposition and risk of explosion, we prefer to charge the catalyst, as a single charge, in admixture with at least 10% by weight of xylene or toluene. For convenience and assured protection we further prefer to use a 50% by weight solution. Other stabilizing chemicals such as cyclohexene, naphthalene, phenol, diphenyl ether etc., may be used in place of xylene or toluene. Other peroxy dicarbonate esters, such as those described in J. Am. Chem. Soc., 72, 1254 (1950), may be substituted in some circumstances. The alkyl groups in the dialkyl peroxy dicarbonates can contain from 1 to 6 carbon atoms. However, diisopropyl peroxy dicarbonate is preferred because of its stability, availability and cost.

Generally, the quantity of dialkyl peroxy dicarbonate catalyst ranges from 0.005 to 0.100 part per 100 parts of vinyl chloride monomer depending upon the grade of polymer sought to be produced. These grades of polymer are related to particle size, e.g., the polymerized products range from the very fine which will pass through a 200-mesh screen up to a product which will be retained on a 40-mesh screen, and degree of polymerization or molecular weight, e.g., products having a specific viscosity of from 0.15 to 0.60. The specific viscosity is measured by the solution viscosimeter method (ASTM D–1243–54). It is equal to the relative viscosity minus one. The relative viscosity refers to the ratio obtained for the flow time of a 0.4% solution of PVC resin in nitrobenzene, to the flow time of nitrobenzene alone, when run through a Fenske modified Ostwald viscosimeter, at 25° C. The grade of polyvinyl chloride is not dependent upon catalyst quantity alone but is also related to temperature, degree of agitation, and the addition of certain optional ingredients, such as surface active and buffering agents. It has been found that most polymer grades can be made at a suitable reaction rate with from 0.018 to 0.025 part of diisopropyl peroxy dicarbonate. However, it is possible to combine the diisopropyl peroxy dicarbonate with conventional free radical type suspension polymerization catalysts, i.e., organic peroxides such as benzoyl peroxide and lauroyl peroxide, in which case as low as 0.005 part of the diisopropyl ester can be effectively used.

The use of a combination of a peroxy dicarbonate ester with an organic peroxide is of considerable advantage in polymerization at higher temperatures. Polymerizations using diisopropyl peroxy dicarbonate alone as sole catalyst tend to die out short of desired conversions as temperatures of polymerization exceed 130° F. The presence of conventional catalyst assures carry-through to high conversion and the presence of diisopropyl peroxy dicarbonate assures rapid, early reaction as desired. When using a combined catalyst of peroxy dicarbonate ester with conventional free radical type catalysts, we generally employ a weight ratio of about 1:3 to about 1:6, the conventional catalyst being in excess. The catalytic quantities of these conventional catalysts, e.g. benzoyl peroxide and lauroyl peroxide, are well known in the polymer art and when used in combination with peroxy dicarbonate ester, will vary with the grade of polymer sought to be produced.

Reaction rate regulators, such as long chain unsaturated aliphatic alcohols and glycol or glycerol esters of the corresponding unsaturated aliphatic acids, which are used in the suspension polymerization of vinyl chloride are of no significant advantage when peroxy dicarbonate catalyst is used alone but may be used to advantage with certain combined catalysts (peroxy dicarbonate ester: organic peroxide mixture).

Our novel suspension polymerization method utilizes any conventional suspension stabilizer such as gelatin, polyvinyl alcohol, water soluble cellulose ethers, etc. Generally the quantity of these stabilizers range between 0.08 to 1.0 part. The quantity and type of suspending agent is not critical to action of catalyst but is somewhat critical to the particle size and other physical properties of the product. The function of these dispersing agents is to prevent coalescence or recombination of the monomer globules as is well known to those skilled in the art. However, as it is very difficult to remove these dispersing agents or stabilizers from the polymerization products, a small quantity is desirable.

Optionally, conventional buffering agents may be added in some formulations in order to vary the physical properties of the polymerized products, e.g., heat stabilization. The use of such buffering agents is not essential for catalytic action of the diisopropyl peroxy dicarbonate.

In addition, part of the suspending system may consist of small amounts of anionic or non-ionic surface active agents. The use of such agents leads to a finer or more porous bead structure. Molecular weight regulators might also be used in the polymerization recipe.

The polymerization of vinyl chloride monomer with diisopropyl peroxy dicarbonate is visually effected at temperatures between 118° F. and 150° F., although in some instances polymerization has been effected at temperatures of 100° F. or lower and as high as 160° F. Higher reaction temperatures yield products of lower molecular weight. The autogenous pressure in the polymerization vessel is generally between 90 to 160 p.s.i. and will vary with temperature, e.g., a temperature of 118° F. will give about 94 p.s.i. whereas the pressure will be about 158 p.s.i. at 150° F.

A suitable formulation would be as follows:

| | Parts by weight |
|---|---|
| Vinyl chloride monomer | 100 |
| Water, variable | >100–400 |
| Colloidal suspension stabilizer | 0.08 |
| Diisopropyl peroxy dicarbonate | 0.018–0.025 |

The water, suspension stabilizer, and vinyl chloride monomer are charged into the polymerizer. The batch is brought to about 118° F. and the diisopropyl peroxy dicarbonate catalyst is charged as a 50% xylene solution. For most grades it is not necessary to bring the batch to temperature before charging catalyst. The reaction is continued until a significant pressure drop is noticed (i.e., about 70–95% conversion) at which point the batch may be transferred to a stripper to remove the unreacted monomer. The batches are then finished or dried to produce the granular polymer.

The dialkyl peroxy dicarbonate catalyst initiates the reaction almost immediately and at the maximum conversion rate whereas the organic peroxide catalysts, e.g., lauroyl peroxide, start the reaction very slowly and finish rapidly so as to give a non-uniform conversion rate. The present invention makes continuous polymerization of vinyl chloride by the suspension method commercially feasible because of the rapid decomposition of the catalyst and the substantially constant bulk reaction rate which is more linear than that of any method known in the past.

An important process improvement resulting from this invention is the increased productivity, i.e., space-time yield, from a given reactor as exemplified by the following table:

| | Examples | | | | | |
|---|---|---|---|---|---|---|
| | 1 | 2 | 3 | 4 | 5 | 6 |
| Vinyl Chloride | 100 | 100 | 100 | 100 | 100 | 100 |
| Water | 200 | 200 | 200 | 200 | 200 | 200 |
| Methyl Cellulose | 0.14 | 0.14 | 0.14 | 0.14 | 0.14 | 0.14 |
| IPP Catalyst [1] | 0.018 | | 0.018 | | 0.018 | |
| Lauroyl Peroxide | | 0.133 | | 0.133 | | 0.133 |
| Reaction time, Hours at 133° F | 7.4 | 11.9 | 7.6 | 12.0 | 7.2 | 12.5 |

[1] Diisopropyl peroxy dicarbonate as a 50% solution in xylene, calculated as part of catalyst per 100 parts of vinyl chloride monomer.

It can be seen from the above examples (wherein all quantities are in parts by weight) that a reduction of approximately 2–3 hours per batch was realized in the polymerization cycle. A conventional catalyst, lauroyl peroxide, was used in the even numbered examples as a control.

The following examples compare diisopropyl peroxy dicarbonate catalyst and conventional lauroyl peroxide catalyst by reaction time and corresponding percentage conversion of vinyl chloride to the polymer.

EXAMPLE 7

| | Reaction Time (Hrs.) | Conversion, Percent |
|---|---|---|
| Water—200 parts | 0.75 | 0 |
| Vinyl Chloride—100 parts | 1.75 | 3.0 |
| Methocel, Reg. 25 cps.—0.1 part | 2.75 | 6.7 |
| Lauroyl Peroxide—0.25 part | 3.75 | 10.0 |
| Temperature—122° F | 4.75 | 14.8 |
| | 5.75 | 20.0 |
| | 6.75 | 27.1 |
| | 7.75 | 32.7 |
| | 8.75 | 41.6 |
| | 9.75 | 49.0 |
| | 10.75 | 58.3 |
| | 11.75 | 69.8 |
| | 12.75 | 82.4 |
| (Final) | 13 hours, 10 min. | 85.0 |

EXAMPLE 8

| | Reaction Time (Hrs.) | Conversion, Percent |
|---|---|---|
| Water—200 parts | 1 | 8.2 |
| Vinyl Chloride—100 parts | 2 | 14.9 |
| Methocel, Reg. 25 cps.—0.1 part | 3 | 22.4 |
| IPP Catalyst—0.03 part | 4 | 31.3 |
| Temperature—122 °F | 5 | 40.3 |
| | 6 | 50.0 |
| | 7 | 60.4 |
| | 8 | 72.3 |
| (Final) | 9 | 85.0 |

EXAMPLE 9

| | Reaction Time (Hrs.) | Conversion, Percent |
|---|---|---|
| Water—200 parts | 1 | 6.7 |
| Vinyl Chloride—100 parts | 2.5 | 16.8 |
| Methocel, Reg. 25 cps.—0.1 part | 3.5 | 24.4 |
| IPP Catalyst—0.025 part | 4.5 | 32.8 |
| Temperature—122° F | 5.5 | 42.1 |
| | 6.5 | 52.2 |
| | 7.5 | 63.1 |
| | 8.5 | 74.9 |
| (Final) | 9 hours, 10 min. | 85.0 |

Examples 7 to 9 are illustrated graphically in FIGURE 1.

The advantageous use of mixed catalyst, e.g. diisopropyl peroxy dicarbonate with lauroyl peroxide, is shown by the following examples:

| | Examples | | | | | | |
|---|---|---|---|---|---|---|---|
| | 10 | 11 | 12 | 13 | 14 | 15 | 16 |
| Vinyl Chloride | 100 | 100 | 100 | 100 | 100 | 100 | 100 |
| Water | 180 | 180 | 180 | 180 | 180 | 180 | 180 |
| Methyl Cellulose | 0.20 | 0.20 | 0.15 | 0.20 | 0.20 | 0.16 | 0.16 |
| IPP Catalyst | | | 0.012 | 0.008 | 0.008 | 0.009 | 0.009 |
| Lauroyl Peroxide | .070 | .070 | | 0.031 | 0.031 | 0.04 | 0.04 |
| Reaction Time (Hrs.) | 10.25 | 9.6 | 8.0 | 8.0 | 8.0 | 6.8 | 7.0 |

In Examples 10 to 16 the temperature control of the polymerizer was set at 90° F. The indicated quantities (parts by weight) of water, lauroyl peroxide (when used), and methyl cellulose were charged into the polymerizer in that order. The temperature control on the polymerizer was increased to 150° F. and the diisopropyl peroxy dicarbonate and vinyl chloride monomer were added to the formulation. The reaction was continued until a significant pressure drop was noticed.

Examples 10 and 11 are typical runs made at 150° F. with lauroyl peroxide catalyst. The reactions proceeded slowly at the start, accelerating to a very fast speed at the end of the reaction. Such non-uniform reaction rate results in inefficient use of the heat transfer capacity of the polymerizer during the early stage of reaction. The very fast reaction rate in the final stage may lead to loss of temperature control because the heat transfer capacity of the polymerizer is exceeded.

Example 12 shows the difficulty encountered when diisopropyl peroxy dicarbonate catalyst is employed alone in a vinyl chloride polymerization at the higher reaction temperatures, e.g. 130° F. to 150° F. The initial reaction rate was rapid but decline therein was observed with the passage of time. In fact, Example 12 required a booster charge of lauroyl peroxide catalyst after 3.5 hours on temperature in order to carry the reaction to completion.

In Examples 13 and 14 a combination catalyst of diisopropyl peroxy dicarbonate and lauroyl peroxide was employed. These examples showed uniform rates. A slightly higher concentration of combined catalyst was employed in Examples 15 and 16 which showed short reaction cycles and fast reaction rates.

The use of conventional catalysts in combination with the peroxy dicarbonate catalysts is particularly important when making the lower molecular weight polyvinyl chloride resins which otherwise cannot be carried to a commercially feasible conversion.

Having thus described our invention, what we claim and desire to protect by Letters Patent is:

1. A process for preparing granular vinyl chloride polymerization products comprising (1) agitating in a closed reaction vessel a suspension of 100 parts by weight of vinyl chloride monomer in from 100 to 400 parts of an aqueous medium containing a suspension stabilizer, (2) introducing from 0.005 to 0.100 part of dialkyl peroxy dicarbonate as catalyst and, (3) heating the suspension to a temperature of from 100° F. to 160° F. until polymerization of the vinyl chloride monomer is complete.

2. A process as in claim 1, wherein diisopropyl peroxy dicarbonate is employed as the catalyst.

3. A process as in claim 2, wherein diisopropyl peroxy dicarbonate is employed in combination with another organic free radical type catalyst in a weight ratio of from 1:3 to 1:6.

4. A process as in claim 3, wherein diisopropyl peroxy dicarbonate is employed in combination with lauroyl peroxide.

References Cited in the file of this patent

UNITED STATES PATENTS

| 2,464,056 | Pechukas | Mar. 8, 1949 |
| 2,464,062 | Strain | Mar. 8, 1949 |
| 2,772,257 | Manganelli | Nov. 27, 1956 |

OTHER REFERENCES

Jour. Am. Chem. Soc., 72, 1259 (1950).